(12) United States Patent
Gary

(10) Patent No.: US 11,857,875 B2
(45) Date of Patent: Jan. 2, 2024

(54) SYSTEM AND METHOD FOR CAPTURING AND SHARING CONSOLE GAMING DATA

(71) Applicant: SONY INTERACTIVE ENTERTAINMENT AMERICA LLC, San Mateo, CA (US)

(72) Inventor: Nathan Gary, Santa Monica, CA (US)

(73) Assignee: SONY INTERACTIVE ENTERTAINMENT LLC, San Mateo, CA (US)

(*) Notice: Subject to any disclaimer, the term of this patent is extended or adjusted under 35 U.S.C. 154(b) by 0 days.

(21) Appl. No.: 16/889,091

(22) Filed: Jun. 1, 2020

(65) Prior Publication Data

US 2020/0289931 A1 Sep. 17, 2020

Related U.S. Application Data

(63) Continuation of application No. 15/703,395, filed on Sep. 13, 2017, now Pat. No. 10,668,377, which is a
(Continued)

(51) Int. Cl.
*A63F 13/497* (2014.01)
*A63F 13/86* (2014.01)
(Continued)

(52) U.S. Cl.
CPC .......... *A63F 13/497* (2014.09); *A63F 13/335* (2014.09); *A63F 13/61* (2014.09); *A63F 13/86* (2014.09); *A63F 2300/407* (2013.01); *A63F 2300/554* (2013.01); *A63F 2300/5506* (2013.01); *A63F 2300/5546* (2013.01);
(Continued)

(58) Field of Classification Search
CPC ... A63F 13/86; A63F 13/497; A63F 2300/634
See application file for complete search history.

(56) References Cited

U.S. PATENT DOCUMENTS 6,319,121 B1  11/2001  Yamada et al.
6,477,314 B1  11/2002  Tai
(Continued)

FOREIGN PATENT DOCUMENTS

CN  1226985 A1  8/1999
CN  1805362 A   7/2006
(Continued)

OTHER PUBLICATIONS

Chinese Office Action ( Application No. 2,01310201425.4) dated Sep. 27, 2017.
(Continued)

*Primary Examiner* — James S. McClellan
(74) *Attorney, Agent, or Firm* — Nixon Peabody LLP

(57) ABSTRACT

A system and method for capturing and sharing console gaming data is described. Embodiments capture gameplay data directly at the gaming console, without the need for external hardware. This allows users to easily capture rich console gaming experiences and share them across a variety of outlets. In one embodiment, the methods described herein can be implemented with a patch or driver on the operating system of the user device, rendering it unnecessary to heavily modify the source code of the game.

18 Claims, 5 Drawing Sheets

Related U.S. Application Data continuation of application No. 13/418,703, filed on Mar. 13, 2012, now Pat. No. 10,525,347.

(51) Int. Cl.
*A63F 13/335* (2014.01)
*A63F 13/61* (2014.01)
*G06V 20/40* (2022.01)

(52) U.S. Cl.
CPC ... *A63F 2300/577* (2013.01); *A63F 2300/634* (2013.01); *G06V 20/49* (2022.01)

(56) References Cited

U.S. PATENT DOCUMENTS

| | | |
|---|---|---|
| 6,699,127 B1 | 3/2004 | Lobb |
| 6,937,813 B1 | 8/2005 | Wilson |
| 7,778,520 B1 | 8/2010 | Virden et al. |
| 8,069,125 B2 | 11/2011 | Jung et al. |
| 8,128,503 B1 | 3/2012 | Haot et al. |
| 2002/0032059 A1 | 3/2002 | Sugimura |
| 2002/0059117 A1 | 5/2002 | Yoch et al. |
| 2004/0121837 A1 | 6/2004 | Chiang |
| 2004/0148221 A1 | 7/2004 | Chu |
| 2006/0136964 A1 | 6/2006 | Diez et al. |
| 2007/0009042 A1 | 1/2007 | Craig |
| 2007/0117635 A1 | 5/2007 | Spanton et al. |
| 2008/0039203 A1 | 2/2008 | Ackley et al. |
| 2008/0096663 A1 | 4/2008 | Lieberman et al. |
| 2008/0113812 A1 | 5/2008 | Kwon |
| 2008/0167127 A1 | 7/2008 | Turkstra |
| 2009/0118008 A1 | 5/2009 | Kobayashi et al. |
| 2009/0119737 A1 | 5/2009 | Perlman et al. |
| 2009/0131177 A1 | 5/2009 | Pearce |
| 2009/0165140 A1 | 6/2009 | Robinson et al. |
| 2009/0208181 A1 | 8/2009 | Cottrell |
| 2009/0235150 A1 | 9/2009 | Berry |
| 2009/0249244 A1 | 10/2009 | Robinson et al. |
| 2009/0253517 A1 | 10/2009 | Bererton |
| 2010/0160038 A1 | 6/2010 | Youm et al. |
| 2010/0292011 A1 | 11/2010 | Kira et al. |
| 2011/0183749 A1* | 7/2011 | Allen ............... G07F 17/3237 463/25 |
| 2011/0312424 A1 | 12/2011 | Burckart |
| 2012/0018506 A1 | 1/2012 | Hammad et al. |
| 2012/0027256 A1 | 2/2012 | Kiyohara et al. |
| 2012/0185066 A1 | 7/2012 | Kern et al. |

FOREIGN PATENT DOCUMENTS

| | | |
|---|---|---|
| CN | 101990451 | 3/2011 |
| CN | 102209120 A | 10/2011 |
| CN | 101637023 B | 1/2012 |
| CN | 101981589 B | 7/2015 |
| JP | 2000-069428 | 3/2000 |
| JP | 2008532687 A | 8/2008 |
| JP | 2009-112550 | 5/2009 |
| JP | 2009-254856 | 11/2009 |
| JP | 2009-254888 | 11/2009 |
| JP | 2009254443 A | 11/2009 |
| JP | 2011-512172 | 4/2011 |
| JP | 2011-516103 | 5/2011 |
| JP | 2011-259184 | 12/2011 |
| JP | 2012005853 A | 1/2012 |
| JP | 2012-033037 | 2/2012 |
| JP | 2003109025 A | 4/2013 |
| KR | 10-2009-0035539 | 4/2009 |
| KR | 1020100037413 | 4/2010 |
| KR | 10-2010-0118986 | 11/2010 |
| TW | 201021561 | 6/2010 |
| WO | WO-2008-104785 | 9/2008 |
| WO | 2009/094611 A2 | 7/2009 |
| WO | WO-2009-102991 | 8/2009 |

OTHER PUBLICATIONS

Taiwanese Search Report (Application No. 102108456) dated Sep. 14, 2017.
Chinese Office Action (Application No. 201310201493.0) dated Nov. 3, 2017.
Korean Notice of Allowance (Application No. 10-2013-0026464) dated Nov. 29, 2017.
Japanese Office Action (Application No. 2015-500471) dated Nov. 7, 2017.
Korean Office Action (Application No. 10-2013-0026466) dated Jan. 25, 2018.
Korean Office Action (Application No. 10-2013-0026467) dated Jan. 25, 2018.
Korean Office Action (Application No. 10-2013-0026466) dated Apr. 4, 2018.
Korean Office Action (Application No. 10-2013-0026467) dated Apr. 4, 2018.
Chinese Rejection Decision ( Application No. 201310201425.4) dated May 18, 2018.
Japanese Office Action (JP Application No. 2015-500471) dated Jun. 5, 2018.
Chinese Office Action (Application No. 201310201493.0) dated Aug. 28, 2018.
European Office Action (Application No. 13 761 779.1) dated Sep. 12, 2018.
European Office Action (Application No. 13 760 882.4) dated Sep. 12, 2018.
"Comparison of Screencasting Software", Wikipedia, Oct. 23, 2015, Retrieved from the Internet: URL:https://en,wikipedia.org/Comparison_of_screencasting_software.
"Snagit for Windows, Version History /Version 11", TechSmith Corporation, Retrieved from the internet: URL:https://www.techsmith.com/snagit-version-history.html.
Notice of Allowance (JP Application No. 2015-500471) dated Oct. 2, 2018.
U.S. Office Action dated Jan. 10, 2019 issued in U.S. Appl. No. 13/418,703.
Korean Office Action (Application No. 2013-0026466) dated Nov. 29, 2018.
European Office Action (Application No. 13 761 888) dated Dec. 11, 2018.
Korean Office Action (Application No. 2013-0026467) dated Nov. 29, 2018.
European Office Action (Application No. 13 761 888.0) dated May 10, 2019.
FRAPS <http:www.fraps.com/faq.php>, (Year: 2012).
Japanese Office Action (Application No. 2018-129419) dated Aug. 20, 2019.
Japanese Office Action (Application No. 2018-129419) dated Jun. 19, 2020.
Japanese Office Action (Application No. 2018-129419) dated Jun. 1, 2021.
U.S. Office Action (U.S. Appl. No. 15/703,395) dated Jun. 13, 2019.
Korean Office Action (Application No. 10-2021-0018886) dated Jun. 9, 2021.
Korean Office Action (Application No. 10-2021-0018886) dated Dec. 24, 2021.
U.S. Office Action (U.S. Appl. No. 16/889,081) dated May 2, 2022.
U.S. Office Action (U.S. Appl. No. 16/889,083) dated May 2, 2022.
Indian Office Action (Application No. 6263/CHENP/2014) dated Dec. 6, 2018.
"What Did I Do to Deserve This, My Lord!?: 3D I also want to save the world ", Weekly Famitsu No. 1107, Enterbrain Inc. Feb. 18, 2010, vol. 25 No. 9 (1107th issue) (11 pages).
Video in the Palm of Your Hand, Anytime, Anywhere—One Seg life realized with "SH705i", ITmedia Mobile (online), Feb. 18, 2008 (11 pages).
European Office Action (Application No. 13 761 779) dated Jun. 17, 2021.
European Office Action (Application No. 13 761 779) dated Mar. 3, 2022.

(56) References Cited

OTHER PUBLICATIONS

Brazilian Office Action (Application No. BR112014022751-9) dated Dec. 17, 2019.
Brazilian Office Action (Application No. BR112014022751-9) dated Sep. 15, 2021.
Brazilian Office Action (Application No. BR112014022751-9) dated Dec. 22, 2021.
European Office Action (Application No. 13 761 888) dated May 28, 2020.
European Office Action (Application No. 13 761 888) dated Sep. 18, 2019.
European Office Action (Application No. 13 761 888) dated Feb. 2, 2021.
Brazilian Office Action (Application No. BR112014022749-7) dated Dec. 17, 2019.
Indian Office Action (Application No. 6262/CHENP/2014) dated Sep. 25, 2019.
Indian Office Action (Application No. 6262/CHENP/2014) dated Feb. 16, 2022.
Korean Office Action (Application No. 10-2013-0026466) dated Jun. 17. 2020.
Brazilian Office Action (Application No. BR112014022750-0) dated Dec. 17, 2019.
Brazilian Office Action (Application No. BR112014022750-0) dated Sep. 15, 2021.
Chinese Office Action (Application No. 201310201425.4) dated Feb. 2, 2019.
Indian Office Action (Application No. 6922/DELNP/2014) dated Aug. 19, 2019.
Indian Office Action (Application No. 6922/DELNP/2014) dated Feb. 16, 2022.
Korean Office Action (Application No. 10-2013-0026467) dated May 15, 2020.
Korean Office Action (Application No. 10-2013-0026467) dated Nov. 11, 2020.
Korean Office Action (Application No. 10-2013-0026467) dated Mar. 19, 2021.
Korean Office Action (Application No. 10-2021-0003355) dated May 3, 2021.
Korean Office Action (Application No. 10-2021-0003355) dated Dec. 24, 2021.
Korean Office Action (Application No. 10-2022-0038207) dated Jul. 15, 2022.
Korean Office Action (Application No. 10-2022-0038210) dated Jul. 15, 2022.
European Office Action (Application No. 21212255.0) dated Jan. 18, 2022.
U.S. Office Action (U.S. Appl. No. 16/889,081) dated Sep. 1, 2022.
Indian Office Action (Application No. 6922/DELNP/2014) dated Sep. 2, 2022.
Japanese Office Action (JP2021-169346) dated Nov. 29, 2022 (full translation), pp. 7.
Chinese Office Action (Application No. 2019112530590) dated Feb. 7, 2023, with full translation (pp. 18).
U.S. Non-Final Office Action (U.S. Appl. No. 16/889,081) dated Mar. 15, 2023 (pp. 11).
iPhone recording/sharing, IPhone 4: How to Record & Upload Video for iPhone 4 (demonstrated on Youtube video dated Oct. 18, 2010 by eHowTech at https://www.youtube.com/watch?v=IvtyV5EBTas).
Korean Final Office Action (Application No. 10-2022-0038210) dated May 23, 2023, with full translation (pp. 5).
European Office Action (Application No. 21 212 255.0) dated Apr. 25, 2023 (pp. 6).

* cited by examiner

SYSTEM AND METHOD FOR CAPTURING AND SHARING CONSOLE GAMING DATA

CROSS-REFERENCE TO RELATED APPLICATIONS

This application is a Continuation Application of U.S. patent application Ser. No. 15/703,395, filed Sep. 13, 2017, which is a Continuation Application of U.S. patent application Ser. No. 13/418,703, filed Mar. 13, 2012, the contents of which are incorporated by reference herein in their entirety.

FIELD

The present disclosure relates generally to console gaming, and more particularly, to systems and methods for capturing and sharing console gaming data.

BACKGROUND

In recent years, gaming consoles have developed universal appeal as a primary source of entertainment and socialization. Video games draw a wide variety of consumers by providing diverse and engaging interactive experiences. Interactivity has been increased by a number of technological developments. For example, gaming consoles now allow users to interact not only with video games, but also with other users. Further, users are able to use both conventional controllers and motion-based controllers or sensors. Progressions in graphics and display technology have also allowed for a rich console gaming experience, complete with advanced, realistic high definition audio and video in some cases. These developments have resulted in a highly unique and individual virtual experience for users.

Over the years, users have experienced an increased ability to share these virtual experiences with others. Websites, forums and message boards dedicated to video games allow users to discuss their particular gaming experiences with other interested users. Social media also provides an outlet for users to discuss their experiences with friends and acquaintances. Networked gaming consoles allow users to share basic, generic indicators of experience, such as "trophies" or level identifiers, with other networked users.

Users seeking to show off their gameplay prowess at a more rich level have limited options, however. Typically, others must watch the user playing a video game in person in order to share the user's experience. Users have sought to overcome this hurdle by capturing their gameplay with an external camcorder pointed at their television, and uploading the resulting diminished-quality media to the internet. Others have installed video capture devices between their computers and gaming consoles. These latter options, however, require expensive and complicated external hardware components in order to capture gameplay, and the skills, knowledge and time to set them up and operate them.

SUMMARY

The system and method disclosed herein allow users to easily capture rich console gaming experiences and share them across a variety of outlets. These and other advantages are realized by providing a system and method for capturing and sharing console gaming data directly from the source without the need for external hardware. In one embodiment, the methods described herein can be implemented with a patch or driver on the operating system of the user device, rendering it unnecessary to heavily modify the source code of the game. In another embodiment, modification of the source code of the game can indeed be used to implement the methods described herein.

According to one embodiment, a method for storing gameplay is described. The method comprises executing gameplay, buffering a first portion of the gameplay, receiving a request to capture a second portion of the gameplay subsequent to the first portion of the gameplay, capturing the second portion of the gameplay, and storing the first and second portions of the gameplay. According to another embodiment, a computer readable medium having computer executable instructions embedded thereon for performing the acts of this method is described. Systems for effecting this method are also described herein.

According to another embodiment, a method for embedding links into stored gameplay is described. The method comprises retrieving stored gameplay and gameplay metadata, identifying relevant links based on gameplay metadata, embedding at least one of the relevant links into the stored gameplay, and storing the embedded gameplay. According to another embodiment, a computer readable medium having computer executable instructed embedded thereon for performing the acts of this method is described. Systems for effecting this method are also described herein.

According to a further embodiment, a method for embedding user IDs into stored gameplay is described. The method comprises retrieving stored gameplay and gameplay metadata, identifying user IDs from gameplay metadata, embedding at least one of the user IDs into the stored gameplay, and storing the embedded gameplay. According to another embodiment, a computer readable medium having computer executable instructed embedded thereon for performing the acts of this method is described. Systems for effecting this method are also described herein.

DETAILED DESCRIPTION

A system and method for capturing and sharing console gaming data is described. In the following description, for purposes of explanation, numerous specific details are set forth in order to provide a thorough understanding of the exemplary embodiments. It is apparent to one skilled in the art, however, that embodiments can be practiced without these specific details or with an equivalent arrangement. In some instances, well-known structures and devices are shown in block diagram form in order to avoid unnecessarily obscuring the embodiments.

Figure 1:
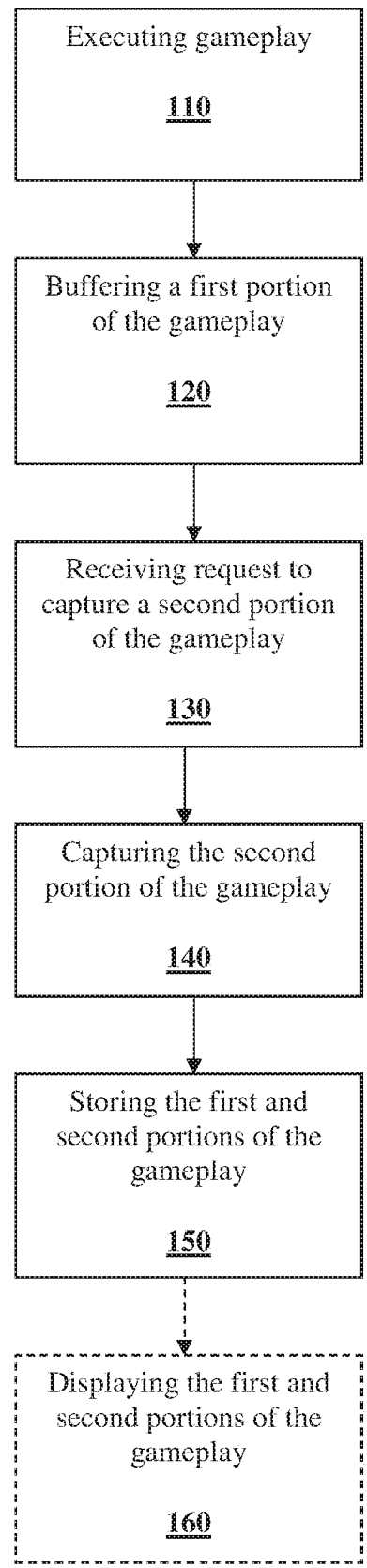
FIG. 1 is a flowchart illustrating a method for storing gameplay according to an embodiment.

Referring now to the drawings, wherein like reference numerals designate identical or corresponding parts throughout the several views, FIG. 1 is a flowchart illustrating a method for storing gameplay according to one embodiment. At processing block 110, gameplay is executed. Gameplay can be executed by the operating system of a game console in response to a user request, which can come in the form of a standard file operation with respect to a set of data associated with the desired gameplay. The request can be transmitted from an application associated with a game. The gameplay can comprise, for example, video content, audio content and/or static visual content, including wall papers, themes, "add-on" content, or any other type of content associated with a game. It is contemplated that such content can be user- or developer-generated, free or paid, full or trial, and/or for sale or for rent.

At processing block 120, a first portion of the gameplay is buffered, i.e., stored temporarily. For example, the previous 15 seconds, the previously completed level, or the previous action within the gameplay can be stored temporarily, as described further herein. The term "portion" used herein can correspond to any part of the gameplay that is divisible into any related or arbitrary groups of single or multiple bits or bytes of data. For example, "portions" of gameplay may correspond to levels, chapters, scenes, acts, characters, backgrounds, textures, courses, actions, songs, themes, durations, sizes, files, parts thereof, and combinations thereof. Further, portions of gameplay can comprise screenshots or prescribed durations of video capture.

At processing block 130, a request to capture a second portion of the gameplay is received. The request to capture the second portion of the gameplay can be a user request, which can come in the form of a standard file operation with respect to a set of data associated with the gameplay to be captured. A user can request to capture a second portion of the gameplay by, for example, selecting a button on a game controller, as described further herein.

The second portion of the gameplay reflects gameplay subsequent to the first portion of the gameplay. In other words, the first portion of the gameplay reflects gameplay that occurred prior to receipt of the user request to capture the second portion of the gameplay. The second portion of the gameplay reflects gameplay that occurred after receipt of the user request to capture the second portion of the gameplay. Thus, the first portion of the gameplay is a past portion of the gameplay that has already been played, while the second portion of the gameplay begins with a current portion of the gameplay that is being executed.

At processing block 140, the second portion of the gameplay is captured. In one embodiment, the second portion of the gameplay is captured according to the user's request. For example, if the user taps a capture button on the game controller, a screenshot or still picture can be taken. If the user holds down a capture button on a game controller, a video can be taken for the length of time the button is being held down. In other words, if the button is held down for 5 seconds, 5 seconds of the gameplay can be captured as the second portion of gameplay; if the button is held down for 10 seconds, 10 seconds of the gameplay can be captured; and so on. In another example, a screenshot or still picture can be taken if the user holds down a capture button, and a video can be taken if the user taps a capture button twice consecutively; once to start the capture, and again to end the capture.

At processing block 150, the first anti second portions of the gameplay are stored. In an embodiment in which the first and second portions of the gameplay are videos, the first portion of the gameplay can be attached to the second portion of the gameplay, such that a single video without interruption is created. In one embodiment, the first and second portions of the gameplay can be stored locally on the game console in either temporary or permanent storage. Alternatively or additionally, the first and second portions of the gameplay can be transmitted over a network and stored remotely. For example, the first and second portions of the gameplay can be transmitted over a wireless or wired network to another computing device, to another game console, or to a remote server. Such remote servers may include social media servers.

Optionally, portions of the gameplay not retrieved from the buffer or portions of the gameplay outside a particular gaming interval (e.g., a particular duration, level, chapter, course, etc.) can be removed from the buffer. This removal process can be completed using standard file operations on the operating system.

At optional processing block 160, the first and second portions of the gameplay are displayed. The first and second portions of the gameplay can be displayed on any of a number of display devices having access to the stored gameplay. For example, the stored gameplay can be displayed on a television set connected to the game console from which the gameplay was captured. In another example, the stored gameplay can be displayed on a computer to which the stored gameplay was transmitted. The stored gameplay can be displayed alone or in conjunction with other information, such as on a social media website.

In one embodiment, the first and second portions of the gameplay are displayed by another game console associated with a user other than the user that buffered or captured the gameplay. According to this embodiment, the first and second portions of the gameplay may show a ball being thrown from a first user to a second user, from the point of view of the first user. The first and second portions of gameplay can then be transmitted to the game console of the second user. Thus, the second user can then view the gameplay from the point of view of the first user. The second user can also have third and fourth portions of gameplay stored showing the ball being thrown by the first user and caught by the second user, from the point of view of the second user. In this embodiment, the second user can review the gameplay from both the point of view of the first user and the point of view of the second user. Still further, the third and fourth portions of the gameplay can be transmitted to the game console of the first user, so that the first user may review the gameplay from two points of view. This embodiment can apply to any number of users having any number of points of view, so that gameplay can be reviewed from any number of different perspectives, With respect to storage, transmission and/or display of the first and second portions of the gameplay as described herein, it is contemplated that the first and second portions of the gameplay can be stored, transmitted and displayed as image or video data. In another embodiment, however, the first and second portions of the gameplay can be stored and transmitted as telemetry or metadata representative of the image or video data, and can be recreated as images or video by a game console or other device prior to display.

In some embodiments, the first portion of the gameplay has a predetermined relationship with the executed gameplay. For example, the first portion of the gameplay can correspond to a certain amount of gameplay prior to the currently executing gameplay, such as the previous 10 seconds of gameplay. In another embodiment, the first portion of the gameplay has a predetermined relationship with the second portion of the gameplay. For example, the first portion of the gameplay can correspond to a certain amount of gameplay prior to receipt of a request to capture the second portion of gameplay, such as the 10 seconds of gameplay prior to selection of the capture button. In each of these embodiments, the amount of gameplay buffered prior to the current gameplay or the requested gameplay can be configured and adjusted by the user according to his or her particular preferences.

In other embodiments, the buffer is "smart" or "elastic", such that it captures gameplay according to variables without regard to time. In one such embodiment, the first portion of the gameplay has a predetermined relationship with an event related to the gameplay. For example, the first portion of the gameplay may be buffered to include a statistical anomaly, such as a high score being reached, the gathering of a large number of points in a short amount of time, the multiple selections of buttons on a controller, and other rare events. Such statistical anomalies can be determined by comparing gameplay metrics to average metrics for a particular game or scene, or for all games generally. Such average metrics can be stored locally or remotely for comparison. For example, a game console can track local high scores for a particular game, and buffer gameplay in which a user approaches and surpasses that high score. In another example, a remote server can track global high scores for a particular game, and can communicate that information to the game console, which buffers gameplay in which the user approaches and surpasses that high score.

In another example, the first portion of the gameplay can be buffered to include an achievement, such as a trophy being attained or other landmark being reached. Such trophies or landmarks memorialize any goal or gaming achievement, such as a certain number of points being attained, a certain level being reached, and the like. For example, gameplay can be buffered to include the awarding of a trophy for reaching level 10, for reaching 100,000 points, etc.

Similarly, progress toward reaching an event, in addition to the actual attainment of the trophy or statistical anomaly, can be buffered to be included in the first portion of the gameplay. For example, a screenshot can be taken at each of levels 1 through 10, creating a photo album to memorialize the receipt of a trophy for reaching level 10. In another example, a video can be taken of a user winning a race for the first through fifth times, where a trophy is awarded for 5 wins.

Thus, according to the embodiment illustrated in FIG. 1, at least a portion of executed gameplay can always be kept in a running buffer. In other words, when a request to capture a portion of the gameplay is received, a portion of the prior gameplay can already be captured to include previous footage. For example, if a request to capture gameplay is received after a user crosses the finish line in a racing game, the buffered gameplay can include footage of the user crossing the finish line. In other words, a user will be able to capture moments occurring before a request is made to capture the gameplay.

Figure 2:
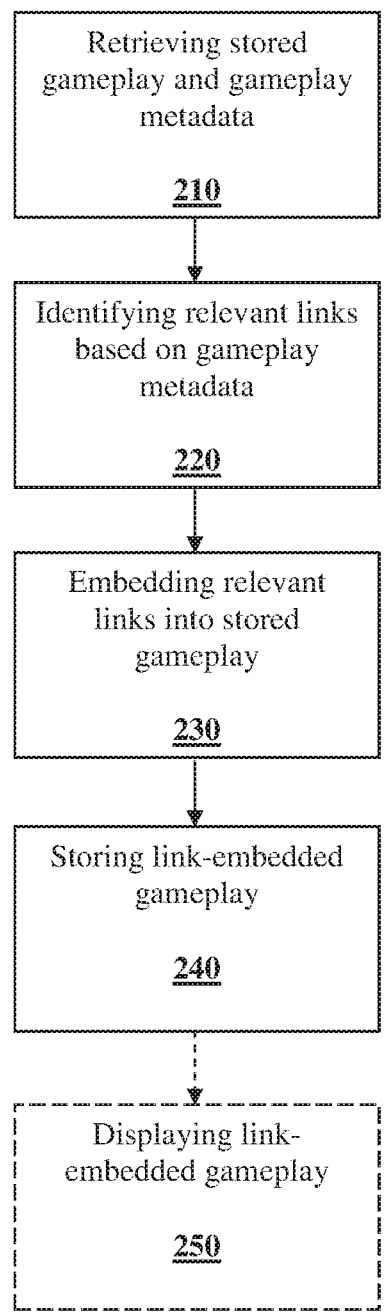
FIG. 2 is a flowchart illustrating a method for embedding links into stored gameplay in accordance with an embodiment.

FIG. 2 is a flowchart illustrating a method for embedding information such as links into stored gameplay in accordance with one embodiment. At processing block 210, stored gameplay and its associated gameplay metadata is retrieved. The stored gameplay may be gameplay or portions thereof stored on any medium. In one embodiment, the stored gameplay comprises the first and second portions of gameplay discussed above with respect to FIG. 1. Gameplay metadata may include, for example, the game title, game publisher, game developer, game distributor, game platform, game release date, game rating, game characters, game genre, game expansions, gameplay level or scene, length of stored gameplay, gameplay storage date, accessories used during gameplay, number of players, user ID of the user that captured the stored gameplay, user IDs of other users identified in the stored gameplay, and the like.

At processing block 220, relevant links are identified based on the gameplay metadata. Relevant links may be hyperlinks, for example. In one embodiment, relevant links are automatically created and generated based on the gameplay metadata. This embodiment can be implemented where websites are named according to a particular naming convention. For example, if a game's website address is assigned according to http://us.playstation.com/games-and-media/games/TITLE-OF-GAME-PLATFORM.html, where TITLE-OF-GAME is replaced with the game's title and PLATFORM is replaced with the game's platform, the method according to this embodiment could pull the title of the game and the game platform from the gameplay metadata, and insert the data into the website address to generate a link. For example, for a game entitled "Sample Game" available on the PS3, the following link could be automatically generated: http://us.playstation.com/games-and-media/games/sample-game-ps3.html.

In another embodiment, relevant links are identified from a plurality of links provided by or available from the game console, the game itself, the gaming network, or a third party server. In this embodiment, relevant links can be selected based on their commonalities with the gameplay metadata. For example, relevant links could include links to the game title's store or purchase page, to the user profiles of other users identified in the stored gameplay, to an informational website about the game title, to a community website dedicated to the game title, to the user's trophy information, to downloadable content or game expansions used in the stored gameplay. to other videos of the same game title and/or game level, to other gameplay captured by the same user, to trailers of upcoming games in the same genre, to clan data, to contests, to advertisements, and the like.

At processing block 230, one or more of the relevant links are embedded into the stored gameplay. In one embodiment, the relevant links are graphically or textually embedded into or overlaid on the screenshot or video itself. In another embodiment, the relevant links are embedded as text accompanying the screenshot or video.

At processing block 240, the link-embedded gameplay is stored. In one embodiment, the link-embedded gameplay is stored locally on a game console in either temporary or permanent storage. Alternatively or additionally, the link-embedded gameplay can be transmitted over a network and stored remotely. For example, the link-embedded gameplay can be transmitted over a wireless or wired network to another computing device, to another game console, or to a remote server. Such remote servers may include social media servers.

At optional processing block 240, the link-embedded gameplay is displayed. The link-embedded gameplay can be displayed on any of a number of display devices having access to and capability to display the link-embedded gameplay. For example, the link-embedded gameplay can be displayed on a television set connected to the game console from which the gameplay was captured. In another example, the link-embedded gameplay can be displayed on a computer to which the stored gameplay was transmitted. The link-embedded gameplay can be displayed alone or in conjunction with other information, such as on a social media website.

In one embodiment, the "sharing" of link-embedded gameplay by users can be encouraged by providing an incentive program. For example, the number of clicks of the relevant links can be tracked. In another example, where the link-embedded gameplay contains a link to a purchase website for the game, the number of game purchases can be tracked. These numbers can then be used to reward users for sharing and distributing link-embedded gameplay. In still another example where the link-embedded gameplay contains a link to a purchase website for the game, a discount on the game can be provided to those users clicking through link-embedded gameplay to encourage purchase of the game and distribution of the link-embedded gameplay.

Figure 3:
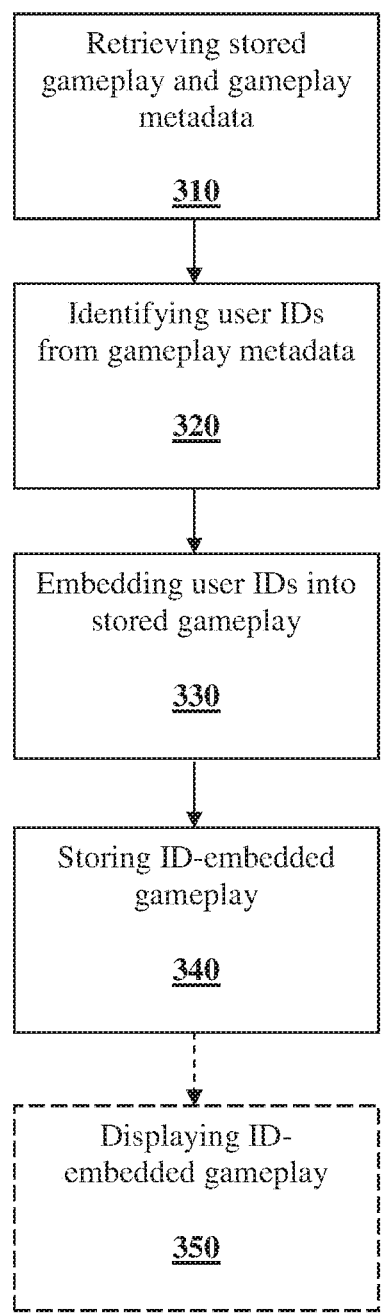
FIG. 3 is a flowchart illustrating a method for embedding user IDs into stored gameplay in accordance with an embodiment.

FIG. 3 is a flowchart illustrating a method for embedding information such as user IDs into stored gameplay in accordance with one embodiment. At processing block 310, stored gameplay and gameplay metadata is retrieved. The stored gameplay may be gameplay or portions thereof stored on any medium. In one embodiment, the stored gameplay comprises the first and second portions of gameplay discussed above with respect to FIG. 1. In another embodiment, the stored gameplay is the gameplay embedded with relevant links discussed above with respect to FIG. 2. Gameplay metadata according to this embodiment includes at least one of the user ID of the user that captured the stored gameplay, and the user ID(s) of other user(s) present in the captured gameplay. The other user(s) present in the captured gameplay can be local users, such as a second user in a two player game connected to the same game console as the first user, or can be remote users, such as networked users connected to a different game console than the first user participating in a partially- or fully-online implemented game.

At processing block 320, user IDs are identified from the gameplay metadata. At processing block 330, the user IDs are embedded into the stored gameplay. In one embodiment, the user IDs are graphically or textually embedded into or overlaid on the screenshot or video itself. In this embodiment, the user IDs can be embedded into or overlaid on their associated graphical representations. For example, if User_1 is represented by a red car in the stored gameplay, and User_2 is represented by a blue car in the stored gameplay, the tag "User_1" can be overlaid on or otherwise associated with the red car, and the tag "User_2" can be overlaid on or otherwise associated with the blue ear. In another embodiment, the user IDs are embedded as text accompanying the screenshot or video. In the latter embodiment, the accompanying text can be text intended to be displayed, such as a description or title, or can be text intended to be invisible upon display, such as embedded gameplay metadata. It is contemplated that the accompanying text can be searchable.

At processing block 340, the ID-embedded gameplay is stored. In one embodiment, the ID-embedded gameplay is stored locally on a game console in either temporary or permanent storage. Alternatively or additionally, the ID-embedded gameplay can be transmitted over a network and stored remotely. For example, the ID-embedded gameplay can be transmitted over a wireless or wired network to another computing device, to another game console, or to a remote server. Such remote servers may include social media servers.

At processing block 350, the ID-embedded gameplay is displayed. The ID-embedded gameplay can be displayed on any of a number of display devices having access and capability to display the ID-embedded gameplay. For example, the ID-embedded gameplay can be displayed on a television set connected to the game console from which the gameplay was captured. In another example, the ID-embedded gameplay can be displayed on a computer to which the stored gameplay was transmitted.

The ID-embedded gameplay can be displayed alone or in conjunction with other information, such as on a social media website. When displayed on a social media website, it is contemplated that the user tags can be compatible with the websites, such that the tags carry over to the social media website. Thus, according to the embodiment described with respect to FIG. 3, the need to manually tag gameplay media with user ID's is eliminated by making the process automatic.

Figure 4:
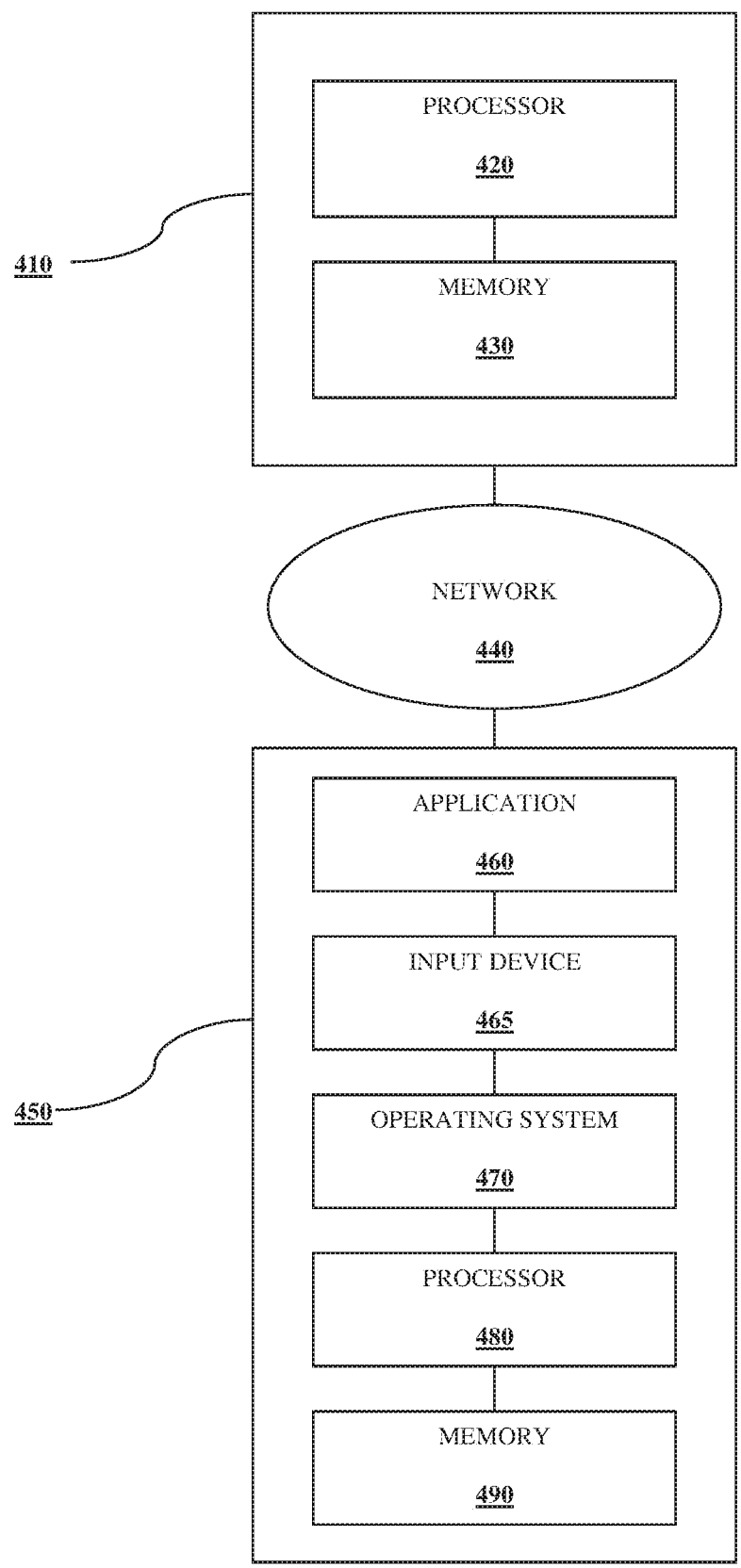
FIG. 4 is a schematic diagram illustrating a system of an embodiment for effecting the methods described herein.

FIG. 4 illustrates a system for effecting the acts of one or more of the methodologies described herein. Server 410 is connected over network 440 to a user device 450. Server 410 includes processor 420 and memory 430, which are in communication with one another. Server 410 is typically a computer system, and may be an HTTP (Hypertext Transfer Protocol) server, such as an Apache server. It is contemplated, however, that server 410 can be a single or multiple modules or devices hosting downloadable content or portions thereof. Further, server 410 can be a dedicated server, a shared server, or combinations thereof. For example, server 410 can be a server associated with the developer, publisher or distributor of the application 460, or a third-party server, such as a peer device in a peer-to-peer (P2P) network. In addition, server 410 can comprise a virtual market or online shopping-based service offering the application 460. In this embodiment, server 410 (alone or in combination with other devices) can process and perform various commercial transactions, such as billing, in addition to those acts described herein.

User device 450 includes application 460, input device 465, operating system 470, processor 480, and memory 490, which are in communication with one another. In one embodiment, user device 450 is a game console. In that embodiment, application 460 may be a game, and input device 465 may be a controller. Server 410 and user device 450 are characterized in that they are capable of being connected to network 440. Network 440 can be wired or wireless, and can include a local area network (LAN), wide area network (WAN), a telephone network (such as the Public Switched Telephone Network (PSTN)), a radio network, a cellular or mobile phone network (such as GSM, GPRS, CDMA, EV-CO, EDGE, 3GSM, DECT, IS-136/TDA, iDEN, and the like), intranet, the Internet, or combinations thereof. Memory 430 and memory 490 may be any type of storage media that may be volatile or non-volatile memory that includes, for example, read-only memory (ROM), random access memory (RAM), magnetic disk storage media, optical storage media, flash memory devices, zip drives, and combinations thereof. Memory 430 and memory 490 can be capable of permanent or temporary storage, or both; and can be internal, external, or both.

In use, application 460 makes calls to operating system 470 to load and access data stored in memory 490, using standard file operations. Application 460 can be any software and/or hardware that provides an interface between a user of user device 450 (via input device 465) and operating system 470. The standard file operations include, for example, "open" (i.e., specifying which file is to be accessed), "seek" (i.e., specifying what position to go to in the file to read data), "read" (i.e., requesting that data be read from the file and copied to application 460), and "close" (i.e., requesting that the file be closed for now).

Figure 5:
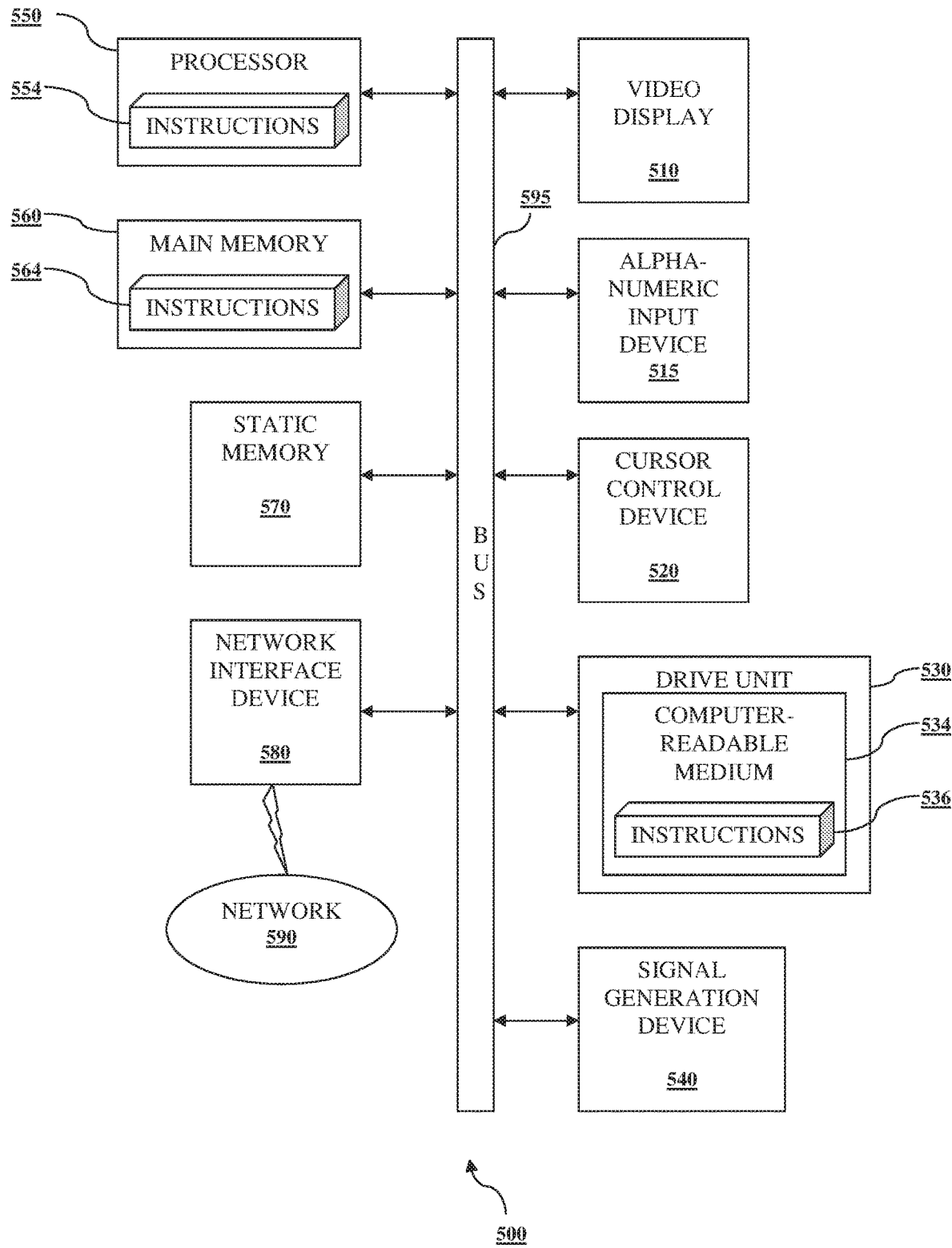
FIG. 5 is diagrammatic representation of a machine having a set of instructions for causing the machine to perform any of the one or more methods described herein.

FIG. 5 shows a diagrammatic representation of machine in the exemplary form of computer system 500 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, as a host machine, or as a peer machine in a peer-to-peer (or distributed) network environment. The machine may be a personal computer (PC), a tablet, a set-top box (STB), a Personal Digital Assistant (PDA), a cellular telephone, a web appliance, a network router, switch or bridge, a game console, a television, a CD player, a DVD player, a BD player, an e-reader or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

According to some embodiments, computer system 500 comprises processor 550 (e.g., a central processing unit (CPU), a graphics processing unit (GPU) or both), main memory 560 (e.g., read only memory (ROM), flash memory, dynamic random access memory (DR AM) such as synchronous DRAM (SDRAM) or Rambus DRAM (RDRAM), etc.) and/or static memory 570 (e.g., flash memory, static random access memory (SRAM), etc.), which communicate with each other via bus 595.

According to some embodiments, computer system 500 may further comprise video display unit 510 (e.g., a liquid crystal display (LCD), a light-emitting diode display (LED), a n electroluminescent display (ELD), plasma display panels (PDP), an organic light-emitting diode display (OLED), a surface-conduction electron-emitted display (SED), a nanocrystal display, a 3D display, or a cathode ray tube (CRT)). According to some embodiments, computer system 500 also may comprise alphanumeric input device 515 (e.g., a keyboard), cursor control device 520 (e.g., a controller or mouse), disk drive unit 530, signal generation device 540 (e.g., a speaker), and/or network interface device 580.

Disk drive unit 530 includes computer-readable medium 534 on which is stored one or more sets of instructions (e.g., software 536) embodying any one or more of the methodologies or functions described herein. Software 536 may also reside, completely or at least partially, within main memory 560 and/or within processor 550 during execution thereof by computer system 500, main memory 560 and processor 550. Processor 550 and main memory 560 can also constitute computer-readable media having instructions 554 and 564, respectively. Software 536 may further be transmitted or received over network 590 via network interface device 580.

While computer-readable medium 534 is shown in an exemplary embodiment to be a single medium, the term "computer-readable medium" should be taken to include a single medium or multiple media (e.g., a centralized or distributed database, and/or associated caches and servers that store the one or more sets of instructions. The term "computer-readable medium" shall also be taken to include any medium that is capable of storing, encoding or carrying a set of instructions for execution by the machine and that cause the machine to perform any one or more of the methodologies of the disclosed embodiments. The term "computer-readable medium" shall accordingly be taken to include, but not be limited to, solid-state memories, and optical and magnetic media.

It should be understood that processes and techniques described herein are not inherently related to any particular apparatus and may be implemented by any suitable combination of components. Further, various types of general purpose devices may be used in accordance with the teachings described herein. It may also prove advantageous to construct a specialized apparatus to perform the methods described herein. Those skilled in the art will appreciate that many different combinations of hardware, software, and firmware will be suitable for practicing the disclosed embodiments.

Embodiments have been described in relation to particular examples, which are intended in all respects to be illustrative rather than restrictive. Further, while embodiments have been described in connection with a number of examples and implementations, it is understood that various modifications and equivalent arrangements can be made to the examples while remaining within the scope of the inventive embodiments.

Other embodiments will be apparent to those skilled in the art from consideration of the specification and practice of the embodiments disclosed herein. Various aspects and/or components of the described embodiments may be used singly or in any combination. It is intended that the specification and examples be considered as exemplary only, with a true scope and spirit of the disclosure being indicated by the following claims.

What is claimed is:

1. A method for embedding links into stored gameplay, the method comprising:
    retrieving stored gameplay and gameplay metadata associated with the stored gameplay;
    generating a link based on the gameplay metadata;
    embedding the link into the retrieved gameplay to create link-embedded gameplay;
    tracking one or more events associated with the link in the link-embedded gameplay; and
    providing an award to a user associated with the stored gameplay based on a number of times the user shared the link-embedded gameplay, the link in the link-embedded gameplay, or a combination thereof.

2. The method of claim 1, wherein the one or more events comprise a number of clicks of the link.

3. The method of claim 1, wherein link directs a user to a purchase website for a game associated with the gameplay, and the one or more events are a number of game purchases originating from the link.

4. The method of claim 1, wherein the number of times the user shared the link-embedded gameplay includes a number of times the user shared the link-embedded gameplay on a social media website.

5. The method of claim 1, wherein the one or more events comprise users selecting the link to purchase a game associated with the gameplay, the method further comprising:
    providing a discount on the purchase of the game for the users based on the users selecting the link.

6. The method of claim 1, wherein the stored gameplay comprises at least one of a screenshot and a video of the gameplay.

7. A system for embedding links into stored gameplay, the system comprising:
    a processor operable to:
        retrieve stored gameplay and gameplay metadata associated with the stored gameplay;
        generate a link based on the gameplay metadata;
        embed the link into the retrieved gameplay to create link-embedded gameplay;

track one or more events associated with the link in the link-embedded gameplay; and provide an award to a user associated with the stored gameplay based on a number of times the user shared the link-embedded gameplay, the link in the link-embedded gameplay, or a combination thereof.

8. The system of claim 7, wherein the one or more events comprise a number of clicks of the link.

9. The system of claim 7, wherein link directs a user to a purchase web site for a game associated with the gameplay, and the one or more events are a number of game purchases originating from the link.

10. The system of claim 9, wherein the number of times the user shared the link-embedded gameplay includes a number of times the user shared the link-embedded gameplay on a social media website.

11. The system of claim 9, wherein the one or more events comprise users selecting the link to purchase a game associated with the gameplay, the processor being further operable to:

provide a discount on the purchase of the game for the users based on the users selecting the link.

12. The method of claim 7, wherein the stored gameplay comprises at least one of a screenshot and a video of the gameplay.

13. A non-transitory computer readable medium having computer executable instructions embedded thereon for performing the steps of:

retrieving stored gameplay and gameplay metadata associated with the stored gameplay;

generating a link based on the gameplay metadata;

embedding the link into the retrieved gameplay to create link-embedded gameplay;

tracking one or more events associated with the link in the link-embedded gameplay; and providing an award to a user associated with the stored gameplay based on a number of times the user shared the link-embedded gameplay, the link in the link-embedded gameplay, or a combination thereof.

14. The non-transitory computer readable medium of claim 13, wherein the one or more events comprise a number of clicks of the link.

15. The non-transitory computer readable medium of claim 13, wherein link directs a user to a purchase website for a game associated with the gameplay, and the one or more events are a number of game purchases originating from the link.

16. The non-transitory computer readable medium of claim 13, wherein the number of times the user shared the link-embedded gameplay includes a number of times the user shared the link-embedded gameplay on a social media web site.

17. The non-transitory computer readable medium of claim 13, wherein the one or more events comprise users selecting the link to purchase a game associated with the gameplay, the non-transitory computer readable medium further having computer executable instructions embedded thereon for performing the step of:

providing a discount on the purchase of the game for the users based on the users selecting the link.

18. The non-transitory computer readable medium of claim 13, wherein the stored gameplay comprises at least one of a screenshot and a video of the gameplay.

* * * * *